US012735651B2

(12) United States Patent
Li et al.

(10) Patent No.: US 12,735,651 B2
(45) Date of Patent: Sep. 15, 2026

(54) SYSTEM AND METHOD FOR PROMOTING GENERATION OF GAS HYDRATES BY WALL-CLIMBING PROCESS

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Yisong Yu, Guangzhou (CN); Wenzhe Sun, Guangzhou (CN); Zhaoyang Chen, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 273 days.

(21) Appl. No.: 18/657,908

(22) Filed: May 8, 2024

(65) Prior Publication Data

US 2025/0171702 A1 May 29, 2025

Related U.S. Application Data

(63) Continuation of application No. PCT/CN2023/136328, filed on Dec. 5, 2023.

(30) Foreign Application Priority Data

Nov. 28, 2023 (CN) ........................ 202311612219.2

(51) Int. Cl.

*C10L 3/10* (2006.01)
*B01J 3/04* (2006.01)
(Continued)

(52) U.S. Cl.

CPC ........... *C10L 3/108* (2013.01); *F17C 11/007* (2013.01); *F17C 2221/036* (2013.01)

(58) Field of Classification Search

CPC .. C10L 3/108; F17C 11/007; F17C 2221/036; B01J 3/04; B01J 3/002; B01J 10/00
See application file for complete search history.

(56) References Cited

U.S. PATENT DOCUMENTS 6,350,928 B1 * 2/2002 Waycuilis ................ B01J 8/007 585/15
8,043,579 B2 * 10/2011 Katoh ..................... C10L 3/108 422/198
(Continued)

FOREIGN PATENT DOCUMENTS

CN 101514300 A 8/2009
CN 202778489 U * 3/2013
(Continued)

OTHER PUBLICATIONS

Hao Wen-Feng, Effects of Stirrer on Methane Hydrate Formation, Natural Gas Chemical Industry, 2005, pp. 5-7, 12, vol. 30 No. 3.
(Continued)

*Primary Examiner* — Tam M Nguyen
(74) *Attorney, Agent, or Firm* — Bayramoglu Law Offices LLC

(57) ABSTRACT

A system and method for promoting generation of gas hydrates by a wall-climbing process is provided. The hydrate is induced to grow upward along a wall surface, in this process, the initially generated hydrate will form many capillary channels, a reaction liquid will move upward along these capillary channels under the action of a capillary force until the front end contacts with a gas-rich phase to form the hydrate, and so on until the reaction of all the reaction liquid is finished. In the reaction process, the hydrate needs to be induced to climb the wall upward to be generated, rather
(Continued)

than grow into a liquid phase, which can enhance not only a gas-liquid mass transfer, but also a gas-hydrate mass transfer.

9 Claims, 1 Drawing Sheet

(51) Int. Cl.
*B01J 19/24* (2006.01)
*F17C 11/00* (2006.01)

(56) References Cited

U.S. PATENT DOCUMENTS

| | | | | |
|---|---|---|---|---|
| 2022/0403773 | A1* | 12/2022 | Doering | F02M 27/02 |
| 2025/0281914 | A1* | 9/2025 | Sullivan | B01J 21/08 |

FOREIGN PATENT DOCUMENTS

| | | | | |
|---|---|---|---|---|
| CN | 109735373 A | | 5/2019 | |
| CN | 113101874 A | * | 7/2021 | B01J 19/0006 |

OTHER PUBLICATIONS

Cheng Chuanxiao, et al., Study on the enhancement of nucleation and growth of methane hydrate by bubbling, Refrigeration, Cryo. & Supercond., 2020, pp. 55-60, 104, vol. 49 No. 2.
Hao Wen-Feng, et al., Experimental Investigation of Methane Hydrate Formation in a Spraying Reactor, Journal of Wuhan University of Technology, 2007, pp. 39-43, vol. 29 No. 12.

* cited by examiner

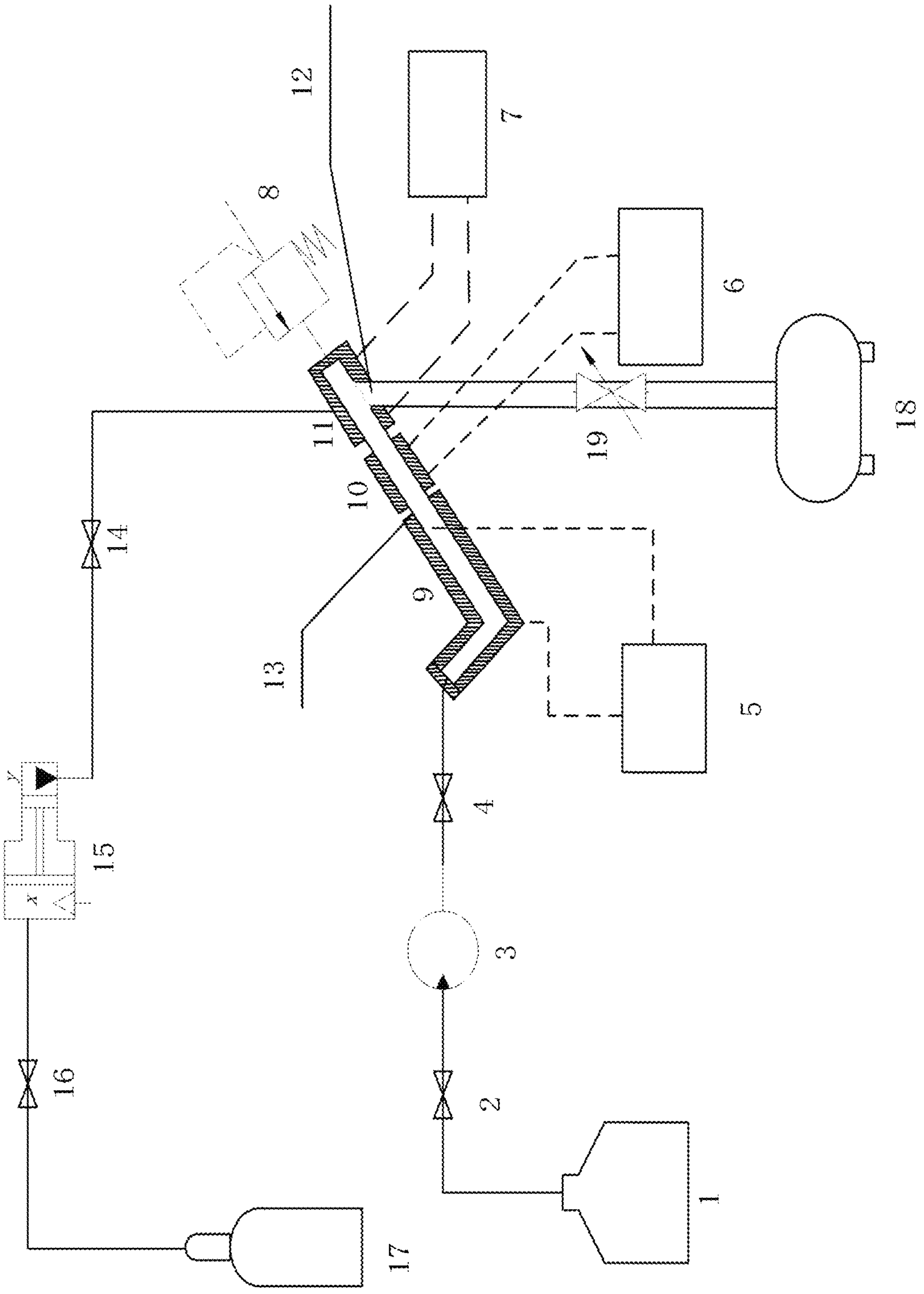
12
7
8
6
18
19
11
10
14
9
13
5
4
15
3
16
2
1
17
x
y

SYSTEM AND METHOD FOR PROMOTING GENERATION OF GAS HYDRATES BY WALL-CLIMBING PROCESS

CROSS REFERENCE TO THE RELATED APPLICATIONS

This application is the continuation application of International Application No. PCT/CN2023/131909, filed on Dec. 5, 2023, which is based upon and claims priority to Chinese Patent Application No. 202311325765.8, filed on Nov. 28, 2023, the entire contents of which are incorporated herein by reference.

TECHNICAL FIELD

The present invention relates to the field of promoting generation of gas hydrates, in particular to a system and method for promoting generation of gas hydrates through a wall-climbing process.

BACKGROUND

Gas hydrates are complexes formed by gas and water at low temperature and high pressure. Due to their excellent physical and chemical properties, researchers have developed a series of promising application technologies, including a natural gas solidified storage and transportation technology by a hydrate method, a gas separation technology by a hydrate method and the like. However, the industrial application of these technologies generally encounters the problems of slow hydrate generation rate, low water conversion rate and low hydrate gas stripping amount. Generation of the hydrates is a process accompanied by material transfer and energy change, and is essentially a process controlled by heat transfer and mass transfer. Therefore, promoting generation of the hydrates is mainly carried out from the aspect of mass transfer enhancement.

The traditional means of mass transfer enhancement mainly includes a mechanical enhancement means such as stirring, spraying and bubbling, and mainly enhances a gas-liquid mass transfer process by increasing a gas-liquid disturbance and improving a gas-liquid contact degree. However, these promotion methods consume a lot of energy, need the assistance of an external power device, and are only suitable for small-scale production. That is, in the prior art, the hydrates generally grow to a liquid phase during reaction.

The literature "Hao Wenfeng, Fan Shuanshi, Wang Jinqu. Effects of Stirring on Methane Hydrate Generation [J]. Natural Gas Chemical Industry, 2005(03):5-7+12" studies the effects of stirring on hydrate generation in detail.

The literature "Cheng Chuanxiao, Li Lun, Hu Shen, et al. Study on Enhancement of Methane Hydrate Nucleation and Growth by Bubbling Method [J]. Cryogenic and Superconducting, 2021,49(02):55-60+104" discusses the promotion effects of bubbling for hydrate nucleation and growth.

The literature "Hao Wenfeng, Sheng Wei, Fan Shuanshi, et al. Experimental Study on Methane Hydration Reaction in Spray Reactor [J]. Journal of Wuhan University of Technology, 2007(12):39-43" evaluates advantages of a spray method in promoting generation of the hydrates. In addition, the introduction of a surfactant can also reduce a gas-liquid interfacial tension to a certain extent and enhance the gas-liquid mass transfer.

Patent "Method for Preparing Gas Hydrate Accelerator" (200910030246.2, Publication No. CN101514300A) provides an accelerator composed of sodium chloride and sodium dodecyl sulfate.

Patent "Method for Preparing Methane Hydrate" (2019101807608, Publication No. CN109735373A) provides a means and method for promoting generation of the methane hydrate by using fluorine surfactants. However, in general, these surfactants are still not high enough in promotion efficiency for hydrate generation, and easily cause different degrees of damage to the environment, with high cost and poor economy.

However, none of the above prior arts can solve the problem of low generation efficiency of the gas hydrates in the prior arts. Therefore, it is urgent to develop a method for promoting the hydrate generation with simple devices, low cost, simple and convenient operation and high efficiency.

SUMMARY

An objective of the present invention is to solve the problems existing in the prior art, and the present invention provides a system and method for promoting generation of gas hydrates by a wall-climbing process.

In order to solve the problems existing in the prior art, the present invention adopts the following technical solution:

A system for promoting generation of gas hydrates by a wall-climbing process includes a liquid supply system, a gas supply system, a reactor and a hydrate storage box; wherein the liquid supply system, the gas supply system and the hydrate storage box are respectively communicated with the reactor; and the reactor is used for hydrate generation, the reactor is a √-shaped reactor, and positions of output ends of the reactor are higher than positions of input ends of the reactor.

As an improvement of the technical solution of the system for promoting generation of hydrates by a wall-climbing process of the present invention, the reactor includes a first input end, a second input end, a first output end and a second output end; and the first input end and the second input end are respectively communicated with the liquid supply system and the gas supply system, the first output end is communicated with outside, and the second output end is communicated with the hydrate storage box.

As an improvement of the technical solution of the system for promoting generation of hydrates by a wall-climbing process of the present invention, the hydrate storage box is arranged right below the second output end.

As an improvement of the technical solution of the system for promoting generation of hydrates by a wall-climbing process of the present invention, the liquid supply system includes a liquid storage tank, a first one-way liquid valve, a liquid pump and a second one-way liquid valve which are sequentially connected through pipelines, and the liquid storage tank is arranged at a position away from the input ends of the reactor.

As an improvement of the technical solution of the system for promoting generation of hydrates by a wall-climbing process of the present invention, the gas supply system includes a gas source, a second one-way gas valve, a booster and a first one-way gas valve which are sequentially connected through pipelines, and the gas source is arranged at a position away from the input ends of the reactor.

As an improvement of the technical solution of the system for promoting generation of hydrates by a wall-climbing process of the present invention, the reactor is divided into three water-cooled jacket sections along a length direction thereof, each water-cooled jacket section is connected with a temperature regulation system, and temperatures of the three water-cooled jacket sections form a temperature gradient.

As an improvement of the technical solution of the system for promoting generation of hydrates by a wall-climbing process of the present invention, the reactor includes a first reaction section and a second reaction section which are connected with each other into a whole, the first reaction section extends from top to bottom, and the second reaction section extends from bottom to top; and a protruding end protruding downward is formed at a joint of the first reaction section and the second reaction section.

As an improvement of the technical solution of the system for promoting generation of hydrates by a wall-climbing process of the present invention, the second reaction section is a wall-climbing section, and spiral blades are capable of arranging in the wall-climbing section.

As an improvement of the technical solution of the system for promoting generation of hydrates by a wall-climbing process of the present invention, an interior of the reactor is metal-surface-modified, and metal-surface-modification is realized individually or cooperatively by adding an additive, changing properties of a reaction wall surface of the reactor and applying a temperature gradient.

A method for promoting growth of gas hydrates by a wall-climbing process includes the following steps:

a liquid supply system supplies liquid for a reactor, and a gas supply system supplies gas for the reactor to form an environment convenient for hydrate generation; in a hydrate generation process, a hydrate grows upward along a wall surface in the √-shaped reactor and the hydrate is generated; and after the hydrate is generated, the wall-climbing hydrate is stored in a hydrate storage box at a hydrate outlet under a gravity action.

The present invention has the beneficial effects:

1. In the present invention, the "wall-climbing" effect is adopted to enhance the generation of the gas hydrates without a need to consume additional energy like the manner such as stirring, bubbling and spraying, thereby greatly reducing an operation cost.
2. In the present invention, the "wall-climbing" effect is adopted to enhance a gas-liquid-solid mass transfer, thereby avoiding the complexity of apparatus design such as stirring, bubbling and spraying, and greatly prolonging the effectiveness and service life of hydrate production apparatuses. The "wall-climbing" enhancement successfully realizes growth of the hydrates in a gas-rich phase, which changes the previous hydrate generation manner, i.e., growth in a water-rich phase. This greatly enhances a gas-liquid mass transfer process and a hydrate-gas mass transfer process, and finally improves a gas stripping amount of the hydrates, thereby providing a reasonable industrial path for hydrate comprehensive utilization technologies.

BRIEF DESCRIPTION OF THE DRAWINGS

Figure is a structural schematic diagram of the present invention.

The meanings of reference signs in the Figure: 1—liquid storage tank; 2—first one-way liquid valve; 3—liquid pump: 4—second one-way liquid valve; 5—first refrigerator; 6—second refrigerator; 7—third refrigerator; 8—safety valve; 9—first water-cooled jacket section; 10—second water-cooled jacket section; 11—third water-cooled jacket section; 12—hydrate outlet; 13—reactor; 14—first one-way gas valve; 15—booster; 16—second one-way gas valve; 17—gas source; 18—hydrate storage box; 19—gate valve.

DETAILED DESCRIPTION OF THE EMBODIMENTS

In order to make the objective, technical solution and beneficial effects of the present invention clearer, the technical solution in the embodiments of the present invention will be described clearly and completely in combination with the accompanying drawings in the embodiments of the present invention. Obviously, the described embodiments are only part but not all of the embodiments of the present invention.

As shown in Figure, a system for promoting generation of gas hydrates by a wall-climbing process includes a liquid supply system, a gas supply system, a reactor 13 and a hydrate storage box 18. The liquid supply system, the gas supply system and the hydrate storage box 18 are respectively communicated with the reactor 13. The reactor 13 is used for hydrate generation, the reactor 13 is a √-shaped reactor 13, and the positions of output ends of the reactor 13 are higher than the positions of input ends of the reactor 13.

The present invention aims to provide a gas-liquid-solid efficient mass transfer system and method for solving the problems such as slow hydrate generation rate, low gas stripping amount and low water conversion rate encountered in an industrialization process of hydrate technologies. Therefore, the hydrate generation rate, the gas stripping amount and the water conversion rate are greatly improved.

In detail, in the present invention, the hydrate is induced to grow upward along a wall surface, in this process, the initially generated hydrate will form many capillary channels, and a reaction liquid will move upward along these capillary channels under the action of a capillary force until the front end contacts with a gas-rich phase to form the hydrate, and so on, until the reaction of all the reaction liquid is finished. In the reaction process, the hydrate needs to be induced to "climb the wall" upward to be generated, rather than grow into a liquid phase, which can enhance not only a gas-liquid mass transfer, but also a gas-hydrate mass transfer.

In order to avoid the generation of a hydrate film due to a higher reaction driving force, an initial hydrate generation condition in the present invention is suggested to be 1.8-2.7 times, preferably 2.2 times, of a gas hydrate phase equilibrium condition.

In some embodiments of the present invention, the interior of the reactor 13 is metal-surface-modified, and metal-surface-modification is realized individually or cooperatively by adding an additive, changing properties of a reaction wall surface of the reactor 13 and applying a temperature gradient. The "wall-climbing" effect of the hydrate can be achieved individually or cooperatively by adding the additive, changing the properties of the reaction wall surface of the reactor 13 and applying the temperature gradient. Changing the properties of the reaction wall surface of the reactor 13 mainly refers to changing hydrophilicity and hydrophobicity of the metal wall surface of the reactor 13.

In addition, since the reactor 13 is a √-shaped reactor 13, the reactor 13 includes a first reaction section and a second reaction section which are connected into a whole, the first reaction section extends from top to bottom, and the second reaction section extends from bottom to top. A protruding end protruding downward is formed at the joint of the first reaction section and the second reaction section. In this way, at the joint of the first reaction section and the second reaction section, a downward concave part is formed in the reactor 13, the reaction liquid can be accumulated in the concave part, and enough reaction liquid can be provided for hydrate generation.

Moreover, the concave part may serve as a starting point of hydrate generation, and the hydrate grows upward along the wall surface of the second reaction section.

In some embodiments of the present invention, the reactor 13 includes a first input end, a second input end, a first output end and a second output end. The first input end and the second input end are respectively communicated with the liquid supply system and the gas supply system, the first output end is communicated with the outside, and the second output end is communicated with the hydrate storage box 18. The second output end is a hydrate outlet 12.

The first input end and the second input end are both arranged at the first reaction section, the first input end may be arranged at the end part of the first reaction section, and the second input end may be arranged at the upper part of the first reaction section. The first output end and the second output end are arranged at the second reaction section, the first output end is arranged at the end part of the second reaction section, and the second output end is arranged at the lower part of the second reaction section of the reactor 13.

When generated and reaching the hydrate outlet 12, the hydrate is concentrated in the hydrate storage box 18 along a pipeline. Preferably, the hydrate storage box 18 is arranged right below the second output end. The wall-climbing hydrate is stored in the hydrate storage box 18 at the hydrate outlet 12 under a gravity action.

Further, a gate valve 19 is arranged between the reactor 13 and the hydrate storage box 18 through a pipeline, and the wall-climbing hydrate falls into the pipeline at the hydrate outlet 12 under the gravity action, and is transported to the hydrate storage box 18 to be stored through the gate valve 19.

Furthermore, the second reaction section is a wall-climbing section, and spiral blades are capable of arranging in the wall-climbing section. Through slow rotation of the spiral blades, the hydrate on the wall surface can be gradually brought to the hydrate outlet 12 for output.

In some embodiments of the present invention, the liquid supply system includes a liquid storage tank 1, a first one-way liquid valve 2, a liquid pump 3 and a second one-way liquid valve 4 which are sequentially connected through pipelines, and the liquid storage tank 1 is arranged at a position away from the input ends of the reactor 13.

In some embodiments of the present invention, the gas supply system includes a gas source 17, a second one-way gas valve 16, a booster 15 and a first one-way gas valve 14 which are sequentially connected through pipelines, and the gas source 17 is arranged at a position away from the input ends of the reactor 13.

In detail, in the present invention, the liquid storage tank 1 in the liquid supply system is filled with a liquid, the liquid may be a hydrate reaction liquid, and the hydrate reaction liquid contains an additive of promoting the "wall-climbing" effect of the hydrate. The hydrate reaction liquid passes through the first one-way liquid valve 2, and then flows through the second one-way liquid valve 4 to enter the reactor 13 through the first input end under an action of the liquid pump 3, completing a liquid feeding process in the hydrate growth process.

The gas in the gas source 17 in the gas supply system flows through the first one-way gas valve 14 under an action of the booster 15 after passing through the second one-way gas valve 16, and then enters the reactor 13 through the second input end, so that the pressure in the reactor 13 reaches a set pressure, completing a gas feeding process in the hydrate generation process.

Before hydrate generation, under joint actions of the liquid supply system and the gas supply system, an environment convenient for hydrate generation is formed.

In the hydrate generation process, the hydrate is induced to grow upward along the wall surface in the √-shaped reactor 13, in this process, the initially generated hydrate will form many capillary channels, and the reaction liquid will move upward along these capillary channels under the action of a capillary force until the front end contacts with the gas-rich phase to form the hydrate, and so on, until the reaction of all the reaction liquid is finished. In the reaction process, the hydrate needs to be induced to "climb the wall" upward to be generated, rather than grow into a liquid phase. This can enhance not only the gas-liquid mass transfer, but also the gas-hydrate mass transfer.

After the hydrate generation, the wall-climbing hydrate is stored in the hydrate storage box 18 at the hydrate outlet 12 under the gravity action.

More specifically, in the present invention, an outlet end of the liquid storage tank 1 is connected with an input end of the first one-way liquid valve 2. An output end of the first one-way liquid valve 2 is connected with an input end of the liquid pump 3. An output end of the liquid pump 3 is connected with an input end of the second one-way liquid valve 4. An output end of the second one-way liquid valve 4 is connected with the first input end of the √-shaped reactor 13. The first output end of the reactor 13 is connected with an input end of the safety valve 8. An output end of the safety valve 8 is connected with air. The second output end of the reactor 13 is connected with an input end of the gate valve 19. An output end of the gate valve 19 is connected with an input end of the hydrate storage box 18. An output end of the gas source 17 is connected with an input end of the second one-way gas valve 16. An output end of the second one-way gas valve 16 is connected with an input end of the booster 15. An output end of the booster 15 is connected with an input end of the first one-way gas valve 14. An output end of the first one-way gas valve 14 is connected with the second input end of the reactor 13.

Furthermore, the √-shaped reactor 13 is equipped with a temperature sensor and a pressure sensor, which can be used to monitor the changes in temperature and pressure in the reactor 13 in real time, so as to adjust transportation of the liquid supply system and the gas supply system as required, and maintain a hydrate generation environment in the reactor 13.

In some embodiments of the present invention, the reactor 13 is divided into three water-cooled jacket sections along a length direction thereof, each water-cooled jacket section is connected with a temperature regulation system, and temperatures of the three water-cooled jacket sections form the temperature gradient. Since each water-cooled jacket section is connected with the temperature regulation system, the temperature regulation system is used to regulate the temperature of each water-cooled jacket section to form the temperature gradient and induce the hydrate to climb the wall in the hydrate generation process. The temperature regulation systems in the present invention are preferably refrigerators.

In detail, the first water-cooled jacket section 9 is connected with a first refrigerator 5, the second water-cooled jacket section 10 is connected with a second refrigerator 6, the third water-cooled jacket section 11 is connected with a third refrigerator 7, and the temperatures of all water-cooled jacket sections are correspondingly regulated by different refrigerators.

The present invention also provides a method for promoting growth of gas hydrates by a wall-climbing process, which includes the following steps: a liquid supply system supplies liquid for a reactor, and a gas supply system supplies gas for the reactor to form an environment convenient for hydrate generation. In the hydrate generation process, the hydrate grows upward along a wall surface in the √-shaped reactor and the hydrate is generated. After the hydrate generation, the wall-climbing hydrate is stored in a hydrate storage box at a hydrate outlet under a gravity action.

Based on the embodiments of the present invention, all other embodiments obtained by those ordinary skilled in the art without creative labor belong to the scope of protection of the present invention.

What is claimed is:

1. A system for promoting generation of gas hydrates by a wall-climbing process, comprising a liquid supply system, a gas supply system, a reactor and a hydrate storage box; wherein the liquid supply system, the gas supply system and the hydrate storage box are respectively communicated with the reactor; and the reactor is used for hydrate generation, the reactor is a V-shaped reactor, and positions of output ends of the reactor are higher than positions of input ends of the reactor.

2. The system for promoting generation of the gas hydrates by the wall-climbing process according to claim 1, wherein the input ends of the reactor comprise a first input end and a second input end, and the output ends of the reactor comprise a first output end and a second output end; and the first input end and the second input end are respectively communicated with the liquid supply system and the gas supply system, the first output end is communicated with outside, and the second output end is communicated with the hydrate storage box.

3. The system for promoting generation of the gas hydrates by the wall-climbing process according to claim 2, wherein the hydrate storage box is arranged right below the second output end.

4. The system for promoting generation of the gas hydrates by the wall-climbing process according to claim 1, wherein the liquid supply system comprises a liquid storage tank, a first one-way liquid valve, a liquid pump and a second one-way liquid valve, wherein the liquid storage tank, the first one-way liquid valve, the liquid pump and the second one-way liquid valve are sequentially connected through pipelines, and the liquid storage tank is arranged at a position away from the input ends of the reactor.

5. The system for promoting generation of the gas hydrates by the wall-climbing process according to claim 1, wherein the gas supply system comprises a gas source, a second one-way gas valve, a booster and a first one-way gas valve, wherein the gas source, the second one-way gas valve, the booster and the first one-way gas valve are sequentially connected through pipelines, and the gas source is arranged at a position away from the input ends of the reactor.

6. The system for promoting generation of the gas hydrates by the wall-climbing process according to claim 1, wherein the reactor is divided into three water-cooled jacket sections along a length direction of the reactor, each of the three water-cooled jacket sections is connected with a temperature regulation system, and temperatures of the three water-cooled jacket sections form a temperature gradient.

7. The system for promoting generation of the gas hydrates by the wall-climbing process according to claim 1, wherein the reactor comprises a first reaction section and a second reaction section, wherein the first reaction section and the second reaction section are connected with each other into a whole, the first reaction section extends from top to bottom, and the second reaction section extends from bottom to top; and a protruding end protruding downward is formed at a joint of the first reaction section and the second reaction section.

8. The system for promoting generation of the gas hydrates by the wall-climbing process according to claim 7, wherein the second reaction section is a wall-climbing section, and spiral blades are configured to be arranged in the wall-climbing section.

9. The system for promoting generation of the gas hydrates by the wall-climbing process according to claim 1, wherein an interior of the reactor is metal-surface-modified, and metal-surface-modification is realized individually or cooperatively by adding an additive, changing properties of a reaction wall surface of the reactor and applying a temperature gradient.

* * * * *